United States Patent
Feng et al.

(10) Patent No.: US 9,264,506 B2
(45) Date of Patent: Feb. 16, 2016

(54) PULL DATA TRANSFER METHOD IN REQUEST-RESPONSE MODELS

(75) Inventors: Hanhua Feng, Perry Hall, MD (US); Anton Viktorovich Riabov, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 13/469,423

(22) Filed: May 11, 2012

(65) Prior Publication Data

US 2014/0067908 A1 Mar. 6, 2014

(51) Int. Cl.
*H04L 29/08* (2006.01)
*H04L 12/733* (2013.01)
*H04L 12/703* (2013.01)

(52) U.S. Cl.
CPC ............... *H04L 67/26* (2013.01); *H04L 45/20* (2013.01); *H04L 45/28* (2013.01); *H04L 67/325* (2013.01)

(58) Field of Classification Search
CPC .... H04L 29/08; H04L 29/06; H04L 29/08072
USPC ......................................................... 709/203
See application file for complete search history.

(56) References Cited

U.S. PATENT DOCUMENTS

| | | | |
|---|---|---|---|
| 7,287,134 B2 | 10/2007 | Miller et al. | |
| 7,721,022 B2 | 5/2010 | Brewer et al. | |
| 2009/0037998 A1* | 2/2009 | Adhya et al. | 726/11 |
| 2009/0172674 A1* | 7/2009 | Bobak et al. | 718/101 |
| 2013/0163579 A1* | 6/2013 | Yadav | 370/352 |

* cited by examiner

*Primary Examiner* — Vivek Srivastava
*Assistant Examiner* — Sibte Bukhari
(74) *Attorney, Agent, or Firm* — Ference & Associates LLC

(57) ABSTRACT

Systems, methods, and products for pull data transfer in a request-response model are provided herein. One aspect provides for generating output data utilizing at least one data generation station; and communicating via the at least one data generation station output data related to at least one data request received from at least one data requesting station responsive to at least one criterion, the at least one criterion comprising one of expiration of a time period or generation of a threshold amount of output data. Other embodiments and aspects are also described herein.

12 Claims, 9 Drawing Sheets

| | Push | Pull |
|---|---|---|
| Operating Systems | Interrupt-driven | Polled I/O |
| Programming Models | Event-driven programming, stream processing | Regular procedural programming |
| Client/Server | HTTP protocol | HTTP Push proposal |
| Non-CS: Supply Chain (also Marketing) | Push strategy | Pull strategy |

|  | Push | Pull |
|---|---|---|
| Operating Systems | Interrupt-driven | Polled I/O |
| Programming Models | Event-driven programming, stream processing | Regular procedural programming |
| Client/Server | HTTP protocol | HTTP Push proposal |
| Non-CS: Supply Chain (also Marketing) | Push strategy | Pull strategy |

FIG. 1

```
typedef struct {
    int fd;         /* the file descriptor of an input stream */
    void *buf;      /* the address of the buffer */
    int pos;        /* the current position */
    int min_len;    /* the minimum length */
    int max_len;    /* the maximum length, i.e., the size of buf */
} buffer_t;

int dr_read_multiple( buffer_t buffers[], int num_buffers,
                      int min_delay, int max_delay );

int blocking_read( int fd, void *buf, int length, uint64_t delay )
{
    int retval; fd_set rfds; struct timeval tv;
    tv.sec = delay / 1000; tv.usec = delay % 1000 * 1000;
    FD_ZERO( &rfds ); FD_SET( fd, &rfds );
    retval = select( fd+1, &rfds, NULL, NULL, tv );
    if ( retval <= 0 )
        return retval;
    return read( fd, buf, length );
}

/* Assuming that the file was be opened with non-blocking mode (O_NONBLOCK).
 * Otherwise, call the following first:
 *     fcntl( fd, F_SETFL, fcntl( fd, F_GETFL, 0 ) | O_NONBLOCK );
 */
int dr_read( int fd, void *buf, int min_len, int max_len, uint64_t min_delay, uint64_t max_delay )
{
    int n, len = 0;
    uint64_t delay = 0;

while ( len < max_len && delay < max_delay && ( len < min_len || delay < min_delay ) )
    {
        n = blocking_read( fd, (char *)buf + len, max_len - len, max_delay - delay );
        if ( n < 0 ) return n;
        if ( n == 0 ) return len;
        len += n;
    } if ( len < max_len && delay < max_delay )
    {
        n = read( fd, (char *)buf + len, max_len - len, max_delay - delay );
        if ( n < 0 && errno != EAGAIN && errno != EWOULDBLOCK ) return n;
        if ( n > 0 ) len += n;
    } return len;
}
```

FIG. 7

PULL DATA TRANSFER METHOD IN REQUEST-RESPONSE MODELS

STATEMENT OF GOVERNMENT INTEREST

This invention was made with Government support under Contract No. H98230-07-C-0383 awarded by Intelligence Agencys. The Government has certain rights to this invention.

FIELD OF THE INVENTION

The subject matter presented herein generally relates to data transfer methods and push and pull data transfer methods in particular.

BACKGROUND

Push and pull data transfer methods are two major strategies utilized by data communication systems. In a pull system, data transmission is initiated by a data receiver or client, essentially forming a request-response transmission model. To the contrary, a push system data transmission requests are initiated by the data publisher or server, wherein the data publisher sends notifications and/or data based on data availability. Exemplary applications include an operating system (OS), where the push model may be characterized as an interrupt-driven system and the pull model as a polled input/output (I/O) system, and a client/server system, where the pull model may be configured as an HTTP protocol and the push model as an HTTP push protocol.

BRIEF SUMMARY

One aspect provides a system comprising: at least one data generation station configured to generate output data; wherein the at least one data generation station is configured to communicate output data related to at least one data request received from at least one data requesting station responsive to at least one criterion, the at least one criterion comprising one of expiration of a time period or generation of a threshold amount of output data.

Another aspect provides a method comprising: generating output data utilizing at least one data generation station; and communicating via the at least one data generation station output data related to at least one data request received from at least one data requesting station responsive to at least one criterion, the at least one criterion comprising one of expiration of a time period or generation of a threshold amount of output data.

A further aspect provides a computer program product comprising: a computer readable storage medium having computer readable program code embodied therewith, the computer readable program code comprising: computer readable program code configured to generate output data utilizing at least one data generation station; and computer readable program code configured to communicate via the at least one data generation station output data related to at least one data request received from at least one data requesting station responsive to at least one criterion, the at least one criterion comprising one of expiration of a time period or generation of a threshold amount of output data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1 provides example push and pull strategies.

FIG. 7 provides an example implementation of an aspect of an embodiment.

DETAILED DESCRIPTION

Figure 2:
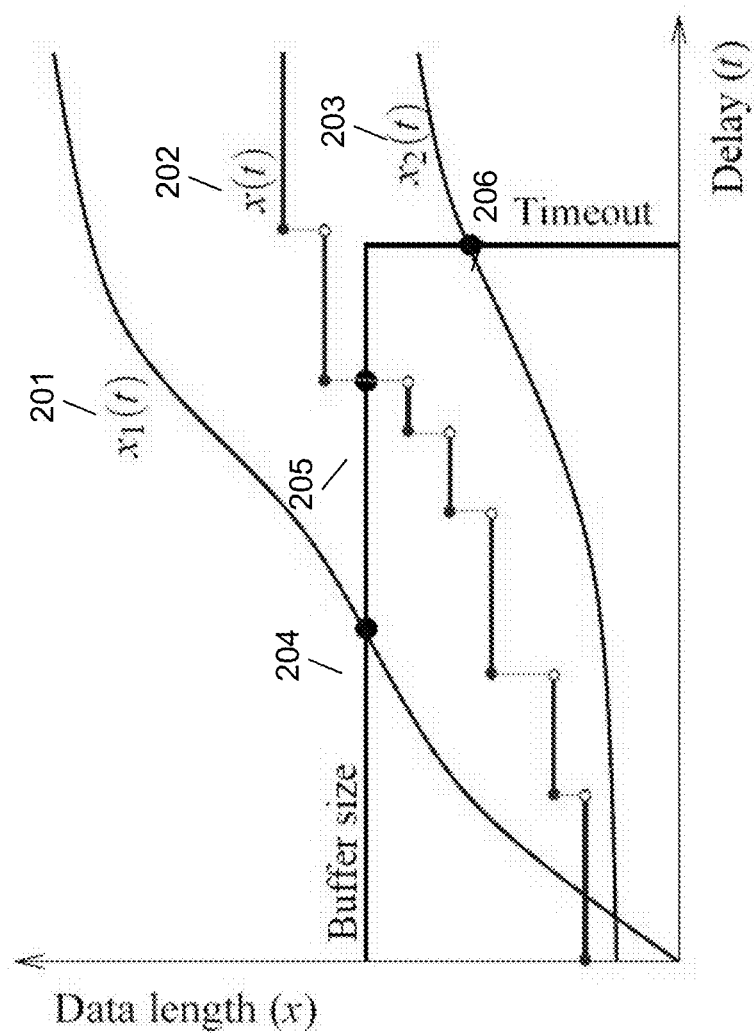
FIG. 2 provides an example graph depicting amount of data as a function of time.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Most data communication systems utilizing a push or pull strategy may be configured to use the alternative transmission strategy (e.g., a pull system may be configured as a push system and vice versa). The pull strategy has been widely accepted as the primary method in most software systems and computer networks because of certain technical difficulties associated with the push strategy, such as complications in design and coding, additional logistic requirements, and security concerns. However, the pull strategy inherently suffers from long latency, low throughput, and high overhead. Therefore, in systems requiring high performance, it is desirable to have a pull strategy that can achieve similar performance as the push strategy.

The distinction between push and pull strategies originally came from supply chain management. These two strategies and their hybrids have been widely used in many other areas, such as marketing and education systems, and, most prominently, computer science and information technology. In computer and network systems, these strategies are often used to describe the communication mechanism between a pair of components, including a data (or service) provider and a data (or service) receiver. With the pull strategy, the provider sends data to the receiver only after a request from the receiver arrives at the provider, whereas with the push strategy, such a request is not required. FIG. 1 provides example push and pull strategies involving actual applications in computer and network systems.

The pull strategy is the dominating method in the world of information technology, due to certain issues with the push strategy in these operating environments. For example, the push strategy appears to be more complicated than the pull method for developers. Modern programmers are accustomed to think in procedure flows (more suitable for the pull strategy) than in-state transition diagrams (more suitable for the push strategy). Historically, programming languages are often designed to better represent procedure flows, and system providing services such as operating systems and web servers are designed to passively accept requests. Consequently, using the push strategy often results in longer code than the pulling method, for example, because developers have to define many call-back functions and/or use large switch statements for the push strategy. Further, in practice, with the main-stream programming model, the push strategy may interrupt the normal processing flow and cause indeterminism and difficult race conditions.

Data providers often require additional resources and can easily overload receivers. With the push strategy, both a provider and a receiver have to maintain queues to store data backlogs. In contrast, with the pull strategy, a single buffer suffices in most cases. With the push strategy, if the provider is not clear about its receivers' capacity, backlogs may accumulate indefinitely. Therefore, a rate-control mechanism may be necessary to adapt to capacity changes. Such a mechanism may require two-way communication between the provider and the receiver, significantly complicating the implementation. Even a well-designed rate-control algorithm can fail in certain unexpected scenarios. The same problem also occurs in supply chains, wherein the push strategy responds poorly to a change of demand and such a change sometimes causes a "bullwhip effect."

The push strategy may also not be viable due to logistic or security reasons. Usually, a single service is used by a large number of users, for example, many applications may run on a single operating system and many browsers may connect to a single web server. In order to improve efficiency, a service provider does not usually track receiver information details, such as data pertaining to user identification, location, or particular requests. Service providers are often publicly available, whereas service receivers tend to maintain anonymity and make requests only when needed. Moreover, service receivers may have additional protections, such as firewalls, making the push strategy difficult or even seemingly impossible to secure.

In addition, in many practical scenarios, the push strategy may be implemented by or partially depend on the pull strategy, in which case the push strategy may not achieve its typical performance advantages. For example, Resource Description Framework (RDF) Site Summary (RSS) updates and desktop email notifications are generally implemented by periodically polling servers. In graphical user interface (GUI) programs, a "main-loop" repeatedly retrieves events from a queue and dispatches them to callback functions. In an operating system (OS), interrupt handling code usually has to retrieve actual data from hardware devices by sending I/O signals to the devices, although the availability of the data may generally be guaranteed. In many client-server architectures, a client has to register with the server or make a subscription in order to receive pushed or published data.

The main problem with the pull strategy is poor performance including high overhead and long latency. These two aspects of performance frequently conflict with each other. In the case of periodical polling, in order to reduce latency, smaller intervals may be utilized, resulting in increased system overhead. In the extreme cases, a "busy-waiting" loop can provide immediate response at the expense of 100% wasted CPU time. Therefore, an improved pull strategy may be realized by determining a better trade-off between low overhead and short latency for the pull strategy.

Accordingly, embodiments provide for improved pull strategy performance facilitated through optimizing overhead and latency trade-offs for a dynamically changing workload. Processes for using pull to achieve the efficiency associated with push according to embodiments may be used for data transfers between any two processes, for example, processes acting as a client and a server. For example, embodiments may provide one or more tunable parameters configured to tune the system according to practical performance requirements. According to embodiments, a scheduling program may use an interface to dynamically change the one or more tunable parameters on the fly according to statistics collected in real time. As such, data providers may ultimately adjust the interval between consecutive pulls according to the actual workload within a pair ranges configured in view of the one or more tunable parameters. Although a server-client environment is used prominently herein, embodiments are not so limited, as embodiments may be generalized for transferring any data or goods between any two stations (e.g., a generating station and a receiving station).

In a typical implementation, a data provider transfers data continuously to a data receiver. In reality, for the provider, data arrives in pieces or is generated at discrete times. The elapsed time between two consecutive data arrivals may be referred to as the "inter-arrival time." In other words, the amount of available data may be a monotonic, right-continuous function of time, increasing only at discrete times, such as the exemplary data availability function $\chi(t)$ provided in FIG. 2. However, if the data pieces are small enough and inter-arrival time is short enough, continuous data availability functions may serve as approximations (e.g., $\chi_1(t)$ 201 and $\chi_2(t)$ 203 in FIG. 2). In FIG. 2, therein is provided data availability functions and response delay schemes using a combination of buffer size and a timeout. The responses 204-206 indicate when a response was sent and how much data was in the response for the two functions 201-203, respectively.

Data providers may differentially respond to data requests, for example, a provider does not have to respond to the receiver immediately after a request, but instead may choose to delay the response, allowing more data to be accumulated. The longer the delay, the more data the provider can provide each time in the response. The amount of available data that the provider may transfer after a delay of time t may be determined by the value of the data availability function $\chi(t)$ 202 illustrated in FIG. 2.

At least two common mechanisms may be used to improve performance. In a first mechanism (i.e., "as fast as possible"), a provider may transfer data in batches by responding only after a buffer is filled. Processing data in batches may reduce the cost due to the number of invocations of processing a component and, therefore, may ultimately reduce the overhead. In a second mechanism (i.e., "as complete as possible"), the provider may respond when a fixed delay time has been reached. In this second mechanism, it may be guaranteed that the latency is bounded by the delay time plus the additional communication and processing delay (if any). These two mechanisms may be mixed together: the response is transferred either when the buffer is filled ($\chi_1(t)$ 201 in FIG. 2) or when a timeout is reached ($\chi_2(t)$ 203 in FIG. 2). For $\chi_2(t)$ 203, the provider may choose to delay the response even though it has some initial data available when the request is received.

In certain data transfer environments, processing overhead may be reduced by utilizing a large buffer size. If the data arrival rate is very high, the buffer may be filled in a short time, and, as a result, latency may be low. If the data arrival rate is very low, a large timeout may be required, comparable to the inter-arrival time; otherwise, the provider is going to transfer empty responses or responses containing very little data, wasting computer and/or network resources. In the case where the data arrival rate is very low, although latency may be high, it is usually acceptable because it is at the same magnitude as the inter-arrival time. In a system with data rates varying over time, a long latency at the time of low data rates may contribute much less to the average latency than the latency at the time of high data rates, for example, because the latency is usually weighed by the amount of data, and the amount of data in a unit time during low rate periods is much lower. Therefore, the simple double-bound method shown in FIG. 2 may apply for both of these extreme cases.

However, moderate data rates may likely produce different data transfer environments wherein the methods shown in FIG. 2 are ineffective. In a moderate data rate environment, it may be desirable to response either before the buffer is filled up or a timeout has been reached; otherwise, the latency may be much longer compared to the inter-arrival time, severely effecting performance.

Figure 3:
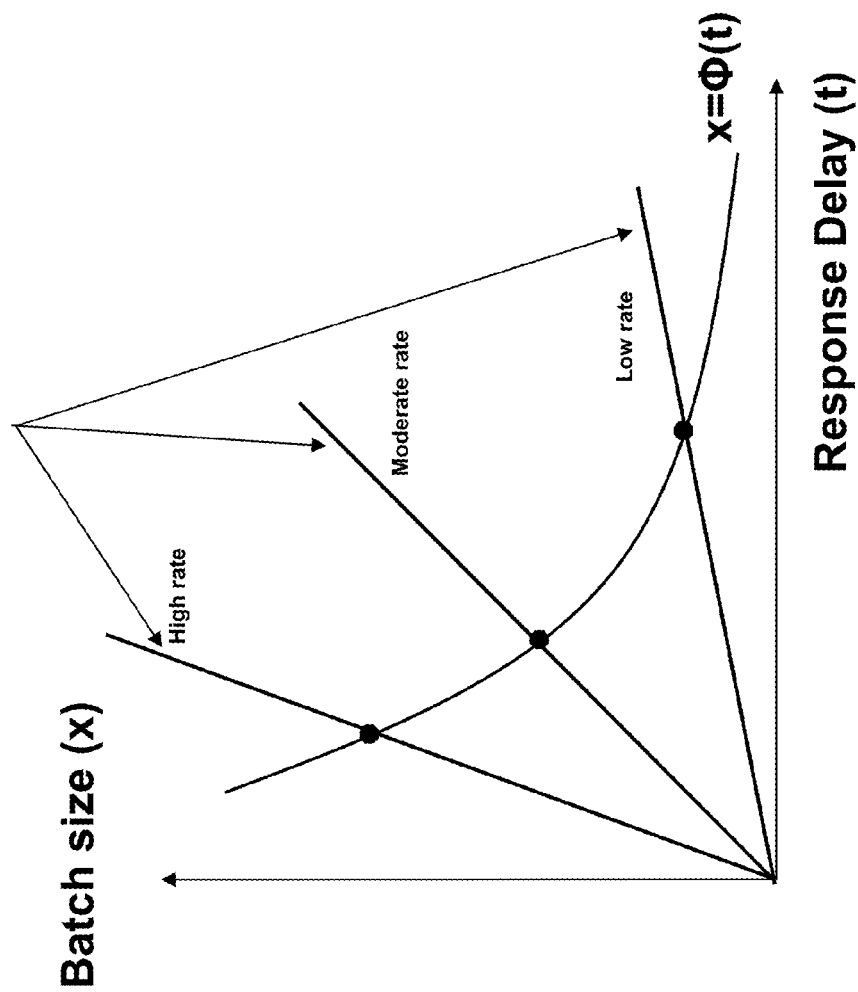
FIG. 3 provides an example graph for optimal batch size when considering overhead and delay elements according to an embodiment.

As depicted in FIG. 3, when both overhead and delay are considered, in general, the optimal batch size $\chi$ may be an increasing function of the data rate, the optimal response delay t may be a decreasing function of the data rate, and the optimal batch size may be an decreasing function of the optimal response delay, $\chi=\Phi(t)$. With unknown or variable data rate, the optimal batch size and response delay may be the cross-points of data availability function and $\Phi$.

Figure 4:
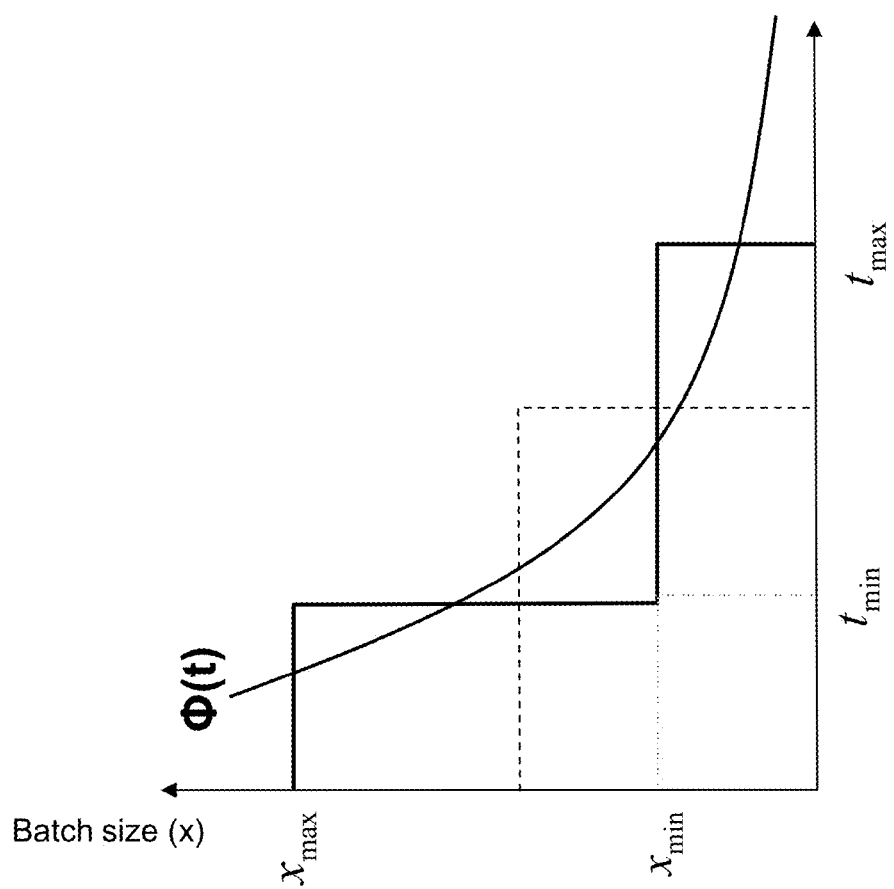
FIG. 4 provides an example data availability function configured according to an embodiment.

Referring to FIG. 4, therein is provided an example data availability function configured according to an embodiment. As shown in FIG. 4, an approximation line may be used to approximate the optimal batch function $\Phi(t)$. A double-range process may be provided according to embodiments that utilizes the following two ranges: $[\chi_{min}, \chi_{max}]$ for batch size; and $[t_{max}, t_{min}]$ for the response delay. Embodiments provide that a response may be made when any of the following are true: (1) $t \geq t_{max}$, wherein the response delay reaches the maximum delay; (2) $\chi \geq \chi_{max}$, wherein the data size reaches the maximum batch size; and (3) $t \geq t_{min}$, and $\chi \geq \chi_{min}$, wherein the response delay reaches the minimum delay and the data size reaches the minimum batch size.

The double-range process arranged according to embodiments may be applied to both pull and push data transfer environments. For push environments, the process may be used for push mechanism alone for better approximations of optimal batch size. In pull environments, the double-range process may result in even better improvement for continuous pull mechanism, since the overhead of each request-response cycle is high. The double-range process may be configured to be a special case of the "as fast as possible" and the "as complete as possible" mechanisms described hereinabove. For example, the "as fast as possible" mechanism may be configured as the case where $\chi_{min}=1$, $\chi_{max}=$buffer size, and $t_{min}=0$, and $t_{max}=$timeout. In another example, the "as complete as possible" mechanism may be configured as the case where $\chi_{min}=\chi_{max}=$buffer size, and $t_{min}=t_{max}=$timeout.

Figure 5:
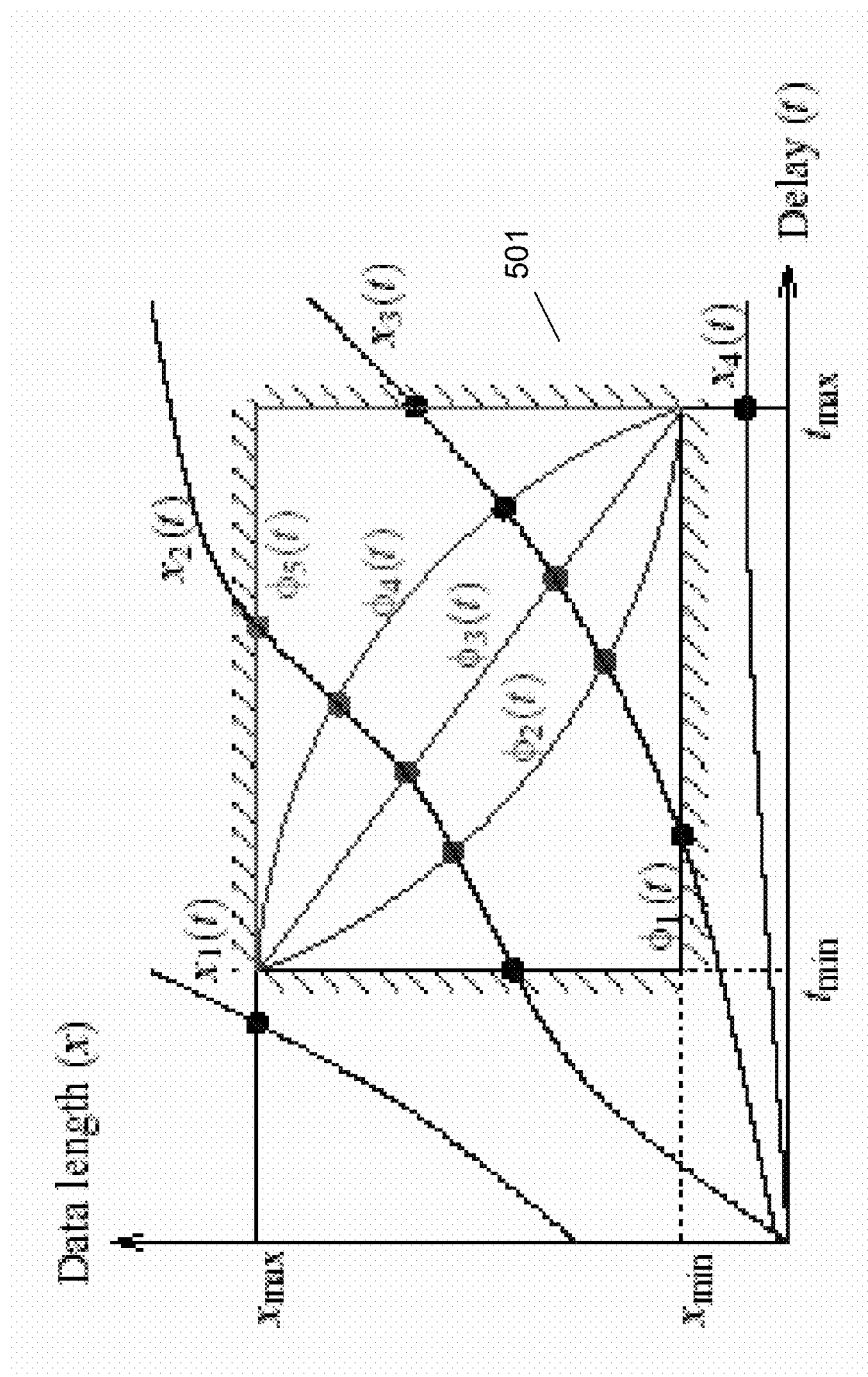
FIG. 5 provides an example double-range process configured according to an embodiment.

Referring to FIG. 5, therein is provided an example double-range process configured according to an embodiment. The double-range process may be configured to include a buffer size (i.e., the maximum amount of data allowed in each response, a timeout (i.e., the maximum delay time), a minimum amount of data, and a minimum delay. Accordingly, the double-range method may operates to provide the following:

(1) The data in each response may never exceed the maximum amount of data $\chi_{max}$ (i.e., buffer size).
(2) The delay of each response may never exceed the maximum delay $t_{max}$ (i.e., delay, timeout).
(3) The data in each response may be no less than the minimum amount of data $\chi_{min}$, unless the timeout is reached. With this requirement, the processing overhead may be bounded for moderate or high data rates, since the data are always processed in batches larger than or equal to this minimum amount. For low data rates, processing overhead may not be an issue because the average overhead per unit time is low.
(4) The delay of each response may be no less than the minimum delay $t_{min}$, unless the buffer is filled. With this requirement, the transmission overhead may be bounded for moderate or low data rates, since the interval between two pulls will be bounded below by $t_{min}$. For high data rates, each data package is large enough and the amortized transmission overhead of per unit length of data is low.

As shown in FIG. 5, $\chi_1(t)$ has a high rate, $\chi_4(t)$ has a low rate, and $\chi_2(t)$ and $\chi_3(t)$ have moderate rates. For moderate rates, the buffer may not be filled within $t_{min}$, and the timeout may not be reached before at least $\chi_{min}$ amount of data is available. If the data rate is moderate, in general, users only need to know the fact that the actual delay and amount of data are within the range $[t_{min}, t_{max}]$ and range $[\chi_{min}, \chi_{max}]$, respectively, as shown by bounded area 501 in FIG. 5. According to embodiments, the double-range process may provide some degree of freedom regarding choosing a scheme for the actual delay time t and the amount of data $\chi$ when a response is sent. Embodiments may provide for a decreasing function $\Phi(t)$ (depicted as $\Phi_{1-5}(t)$ in FIG. 5) wherein $\chi_{max}=\Phi(t_{min})$ and $\chi_{min}=\Phi(t_{max})$, and the response may be sent whenever $\chi(t)$ crosses $\Phi(t)$. The $\Phi(t)$ function may be referred to as the "scheme function" of the double-range process.

Embodiments provide for a double-range process that may be differentially configured to handle different data rates. The following is a list of possible process configurations for moderate data rates:

(1) Send the response when either the data amount reaches $\chi_{min}$ or the delay reaches $t_{min}$, whichever takes shorter time (e.g., $\Phi_1(t) \equiv \chi_{min}$ for $t \in (t_{min}, t_{max})$ as shown in FIG. 5).
(2) Send the response according to a decreasing linear function (e.g., $\Phi_3(t)=[\chi_{max}t_{max}-\chi_{min}t_{min}-(\chi_{max}-\chi_{min})t]/(t_{max}-t_{min})$ for $t \in (t_{min}, t_{max})$ as shown in FIG. 5).
(3) Send the response when either $\chi=\chi_{max}$ or $t=t_{max}$, whichever takes shorter time (e.g., $\Phi_5(t) \equiv \chi_{max}$ for $t \in (t_{min}, t_{max})$ as shown in FIG. 5). This strategy may correspond to the double-bound process provided in FIG. 2, and, as such, may serve as a baseline for performance measurement.

(4) A concave function (e.g., $\Phi_2(t)$ in FIG. 5) or a convex function (e.g., $\Phi_4(t)$ in FIG. 5) may be utilized within the bounded area 501 of FIG. 5.

As such, the example embodiment depicted in FIG. 5 provides that $\Phi(t) \equiv \chi_{max}$ for $t \in [0, t_{min}]$ and $\Phi(t)$ for $t \geq t_{max}$.

In practice, most applications come with their own natural ranges for amount of data and delay. Embodiments provide that the maximum amount of data $\chi_{max}$ may be given by the amount of allocated memory provided by a service provider, and the minimum amount of data $\chi_{min}$ may be given by the size of an atomic datum, for example, a single data point or even a single byte. The minimum delay $t_{min}$ may be given by the time used by the service provider to process a request and prepare a response, and the maximum delay $t_{max}$ may be given by a specified system or application timeout (e.g., HTTP request timeout).

Figure 6:
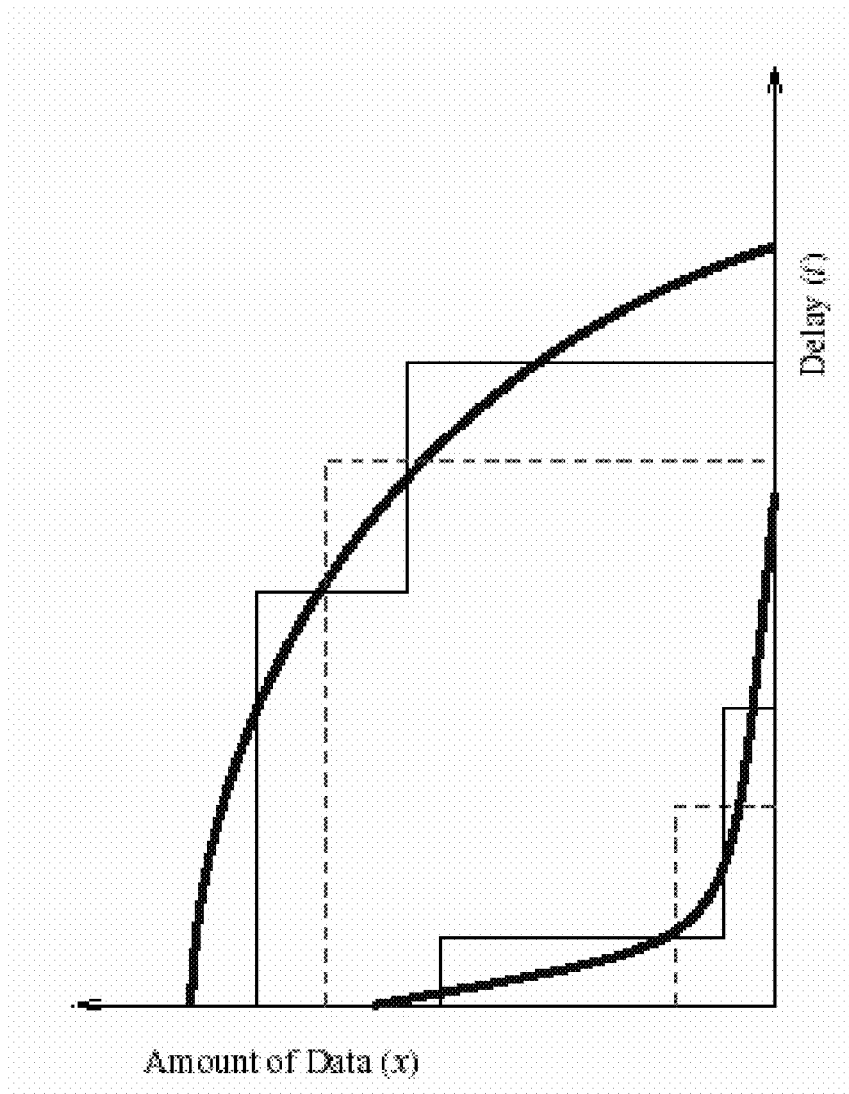
FIG. 6 provides an optimal $\Phi(t)$ approximation according to an embodiment.

According to embodiments, the optimal $\Phi(t)$ may be approximated utilizing one or more functions. In a first non-limiting example, the optimal $\Phi(t)$ may be approximated with $\Phi_1(t)$, wherein the provider sends a response as soon as the following condition is met: $\chi \geq \chi_{max}$ or ($t \geq t_{min}$ and $\chi \geq \chi_{min}$) or $t \geq t_{max}$. FIG. 6 provides another non-limiting example of an optimal $\Phi(t)$ approximation according to an embodiment. In FIG. 6, the optimal $\Phi(t)$ may be approximated utilizing $\Phi_1(t)$ and $\Phi_5(t)$. Ranges utilized in the optimal approximation depicted in FIG. 6 may involve larger $\chi_{min}$ and $t_{min}$ and smaller $\chi_{max}$ and $t_{max}$, inter alia, to achieve a more precise approximation. As shown in FIG. 6, $\Phi_1(t)$ 601 and $\Phi_5(t)$ 602 may be used to approximate optimal $\Phi(t)$ functions 603.

The double-range method provided according to embodiments described herein may be utilized within various operating environments, including software programming, information technology, and any process involving transferring any data or goods between any two stations. An illustrative and non-restrictive first use case example involves an optimized pull programming model for input and output (I/O) operations. In particular, the first use case example involves I/O operations in a LINUX environment described via input operations, but which may be equally applied to output operations. LINUX is a registered trademark of Linus Torvalds.

On a Linux system, an input stream may be read with the following system call: ssize_t read(int fd, void *buf, size_t length); where fd is a UNIX descriptor for either a file or a stream source such as a TCP socket. UNIX is a registered trademark of The Open Group. The parameter buf is a pre-allocated buffer with a size of length. There are two modes under which this system call may behave differently: the blocking mode and the non-blocking mode. Under the blocking mode (i.e., synchronous I/O), this system call may be blocked until at least one byte is read into the buffer, until end-of-file is reached, or until some I/O error is detected. Under the non-blocking mode (e.g., asynchronous I/O), this function may return immediately, and, if no data is available in the buffer, this function returns a code of EAGAIN or EWOULDBLOCK to ask the caller to invoke it again at a later time.

The blocking and non-blocking modes may be unified with the double-range method configured according to embodiments. The first use case may utilize the following function: int dr_read(int fd, void *buf, size_t min_len, size_t max_len, uint64_t min_delay, uint64_t max_delay); where min_len and max_len are the minimum and maximum numbers of bytes to read, and min_delay and max_delay are the minimum and maximum of delay. The blocking and non-blocking read system calls may be implemented according to the following: dr_read(fd, buf, 1, length, 0, UINT64_MAX); and dr_read(fd, buf, 0, length, 0, 0); respectively, where UINT64_MAX equals $2^{64}-1$. This configuration of dr_read( ) may be utilized in other scenarios. For example, to fill an entire buffer with a size of 1024, dr_read( ) may be invoked with dr_read (fd, buf, 1024, 1024, 0, UINT64_MAX). If the standard read( ) system call is used instead, a call read( ) would have to loop repeatedly until the entire buffer is filled. In another example, to read at least one byte into a buffer in blocking mode while performing another function wherein no data is available for a certain period of time (e.g., 5 seconds), dr_read(fd, buf, 1, length, 0, 5000) may be used, with an assumed delay time represented in milliseconds. Without utilizing this configuration of the dr_read( ) function, system calls to select ( ) within LINUX or multiple threads would be required, resulting in much more complicated code in both cases.

Referring to FIG. 7, therein is provided an example implementation wherein the function dr_read( ) is configured to handle multiple input streams, utilizing existing non-blocking read( ) and select( ) LINUX system calls. In the implementation shown in FIG. 7, it is assumed that file descriptor fd is in non-blocking mode. In addition, the function dr_read( ) may be implemented within the kernel of an operating system and provided as a system call. The dr_read( ) function as described herein may operate to simplify the code for many scenarios, for example, a Java™ implementation of dr_read( ) may function replace Java™ new I/O (NIO) application programming interfaces (APIs). The dr_read_multiple( ) function provided in FIG. 7 may return if the maximum length of any of the input streams has been reached, if any of the maximum lengths has been reached, or if both the minimum delay and at least one of the minimum lengths has been reached.

An illustrative and non-restrictive second use case example involves Hypertext Transfer Protocol (HTTP), a pull-based, request-response protocol. A web-based visualization framework provides a way to visualize real-time streaming data in web browsers, for example, web browsers based on Asynchronous JavaScript and XML (Ajax). After web pages are loaded in browsers, sequential XMLHttpRequest calls are issued to retrieve streaming data from a server. In the framework configured for the second user case, data are sent incrementally in order to save bandwidth, such that data appearing in previous responses may not be received again. Instead of sending responses immediately after receiving an HTTP request, the server may wait for a certain period of time (e.g., a few seconds) depending on the availability of new data. This approach may be referred to as "Ajax push" or "Ajax long polling." Client code may then issue the next XMLHttpRequest calls right after receiving and processing the response of the previous call, and the frequency of the XMLHttpRequest calls may be entirely controlled by the server.

To determine the time to wait, the double-range method configured according to embodiments may be utilized with the scheme $\Phi_1(x)$ by default. In addition, a fairly large max_delay (10 seconds) but a small min_delay (less than 1 second) may be utilized. The max_delay value may be set even larger, but it must be less than any timeout that a web browser may use. The values of min_len and max_len may depend on the application. For plotting a time series of data points, an example default setting may be configured to utilize one (data point) for min_len and setting max_len to be the same as the number of points that may show simultaneously in the plot. However, according to embodiments, both ranges may be configurable in our framework. With the embodiment described in the second use case, the latency of data may be reduced by the small min_delay whereas the responsiveness of the browser may be significantly improved by the lower overhead associated with communication and processing functions.

In brief recapitulation, embodiments described herein are directed toward processes for using pull to achieve the efficiency of push for data transfers between two processes, acting as a client and a server. However, embodiments are not limited to client and server processes, as they may be generalized for transferring any manufactured goods or information products between two stations. In a certain embodiment, data is transferred from a web application deployed in a web server to a web browser client, for example, as a web browser-based visualization of a continuous stream of time series data, such as moving stock price plots. In addition, a server configured according to embodiments may support multiple clients, transferring the same or different data streams thereto.

Figure 8:
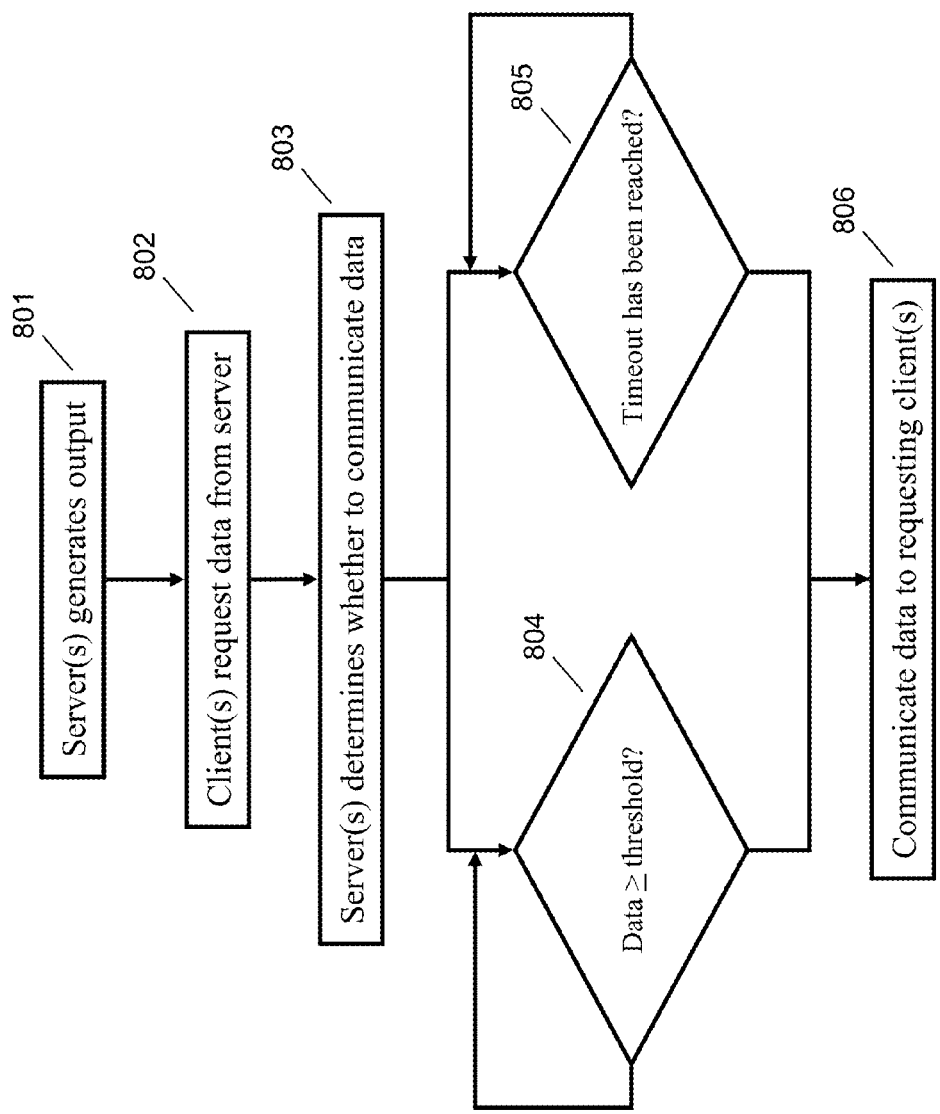
FIG. 8 a server-client pull framework configured according to embodiments.

Referring now to FIG. 8, therein is provided a server-client pull framework configured according to embodiments. A server generates output over time 801, for example, in a manner wherein the size of the output increases over time. A request for new data is submitted to the server by one or more clients 802. The server determines whether to communicate data related to the new data request based on active criteria 803, including whether to delay the response until more data arrives (e.g., based on a specified threshold) 804, a specific wait time has been reached 805, or some combination thereof. When the active criteria 804, 805 have been met, the server may communicate the data to the one or more requesting clients 806. The response delay decision may be based on one or more parameters, including, but not limited to, minimum delay, maximum delay, minimum data size, and maximum data size.

According to embodiments, the server may decide not to wait if one or more of the following conditions are met at the time when the request is being evaluated: the delay already experienced by the client exceeded the maximum delay; the data size to be sent to the client (i.e., server output size) exceeds the maximum data size; both of the following conditions are met: the data size to be sent is equal to the minimum data size, and the delay experienced by the client is equal or higher than the minimum delay; or some combination thereof. If the server decides to delay the response, it may decide to not respond to the client and re-evaluate the decision at a later time based on a method for determining a time for re-evaluation. For example, in one embodiment, the server may wait an affixed amount of time before re-evaluating the decision.

Figure 9:
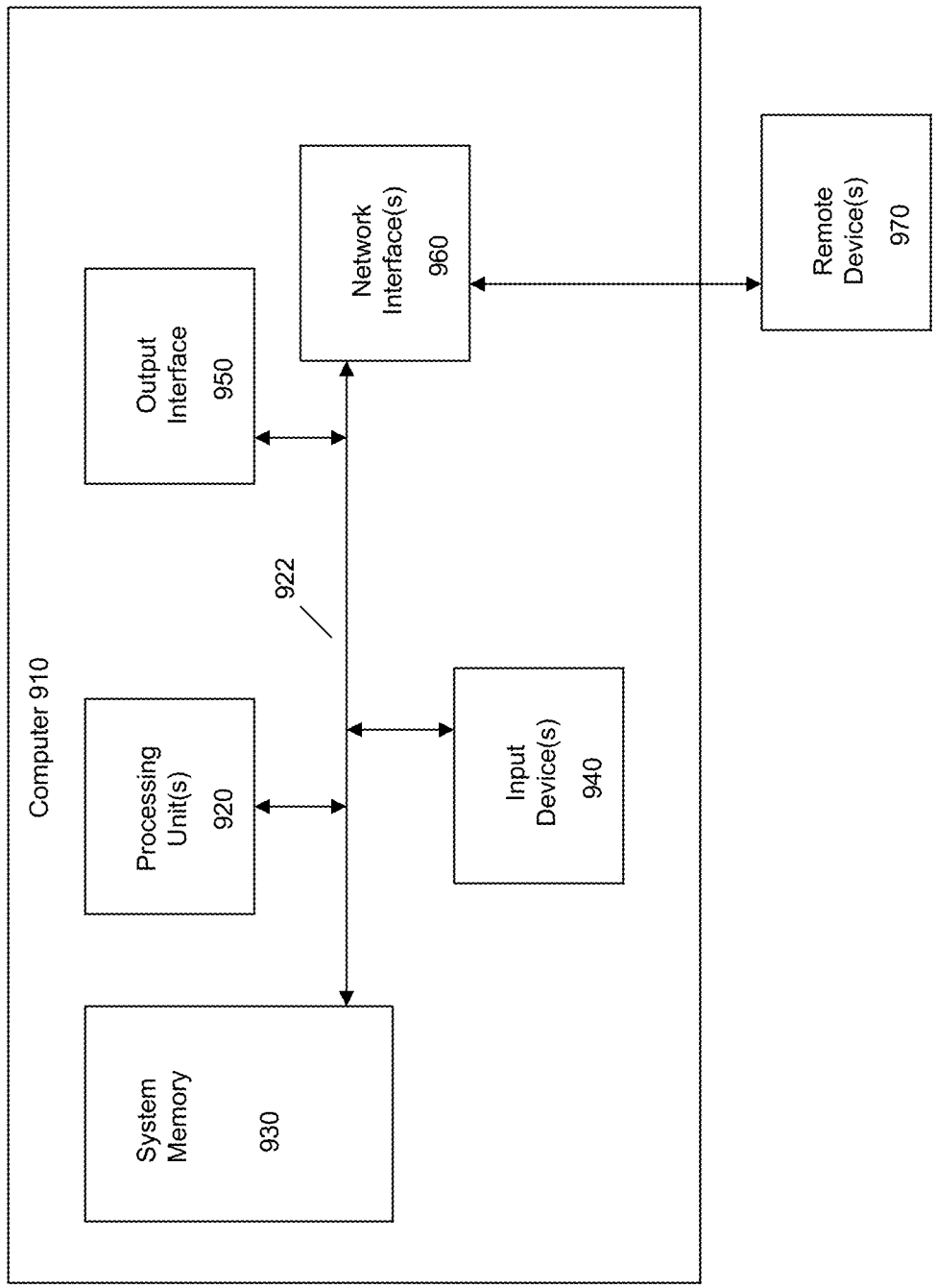
FIG. 9 illustrates an example computing device.

Referring to FIG. 9, it will be readily understood that certain embodiments can be implemented using any of a wide variety of devices or combinations of devices. An example device that may be used in implementing embodiments includes a computing device in the form of a computer 910, which may take the form of a server, a workstation computer, a mobile device, and the like. In this regard, the computer 910 may execute program instructions configured to provide predictive placement of content through network analysis, and perform other functionality of the embodiments, as described herein.

Components of computer 910 may include, but are not limited to, at least one processing unit 920, a system memory 930, and a system bus 922 that couples various system components including the system memory 930 to the processing unit(s) 920. The computer 910 may include or have access to a variety of computer readable media. The system memory 930 may include computer readable storage media in the form of volatile and/or nonvolatile memory such as read only memory (ROM) and/or random access memory (RAM). By way of example, and not limitation, system memory 930 may also include an operating system, application programs, other program modules, and program data.

A user can interface with (for example, enter commands and information) the computer 910 through input devices 940. A monitor or other type of device can also be connected to the system bus 922 via an interface, such as an output interface 950. In addition to a monitor, computers may also include other peripheral output devices. The computer 910 may operate in a networked or distributed environment using logical connections (network interface 960) to other remote computers or databases (remote device(s) 970). The logical connections may include a network, such local area network (LAN), a wide area network (WAN), a cellular network, but may also include other networks.

Those skilled in the art will recognize that aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system comprising:
    at least one data generation station which generates and communicates output data related to at least one data request received from at least one data requesting station responsive to user-defined criteria comprising expiration of a time period and generation of a threshold amount of output data, and responsive to a user-configurable scheme function;
    wherein the criterion of expiration of a time period defines a minimum time delay and a maximum time delay;
    wherein the criterion of generation of a threshold amount of data defines a minimum batch size and a maximum batch size; and
    wherein the at least one data generation station communicates output data responsive to:
    a data size reaching the maximum batch size;
    a data size reaching the minimum batch size; and
    a delay time reaching the minimum delay time.

2. The system according to claim 1, wherein the at least one data generation station comprises at least one server.

3. The system according to claim 2, wherein the at least one data requesting station comprises at least one client.

4. The system according to claim 1, wherein the at least one data generation station comprises an operating system.

5. The system according to claim 4, wherein the at least one data requesting station comprises at least one application.

6. The system according to claim 1, wherein the at least one data generation station communicates output data responsive to a delay time reaching the maximum time delay.

7. A method comprising:
    generating output data utilizing at least one data generation station; and
    communicating via the at least one data generation station output data related to at least one data request received from at least one data requesting station responsive to user-defined criteria comprising expiration of a time period and generation of a threshold amount of output data, and responsive to a user-configurable scheme function;
    wherein the criterion of expiration of a time period defines a minimum time delay and a maximum time delay;
    wherein the criterion of generation of a threshold amount of data defines a minimum batch size and a maximum batch size; and
    wherein the at least one data generation station communicates output data responsive to:
    a data size reaching the maximum batch size;
    a data size reaching the minimum batch size; and
    a delay time reaching the minimum delay time.

8. The method according to claim 7, wherein the at least one data generation station comprises at least one server.

9. The method according to claim 8, wherein the at least one data requesting station comprises at least one client.

10. The method according to claim 7, wherein the at least one data generation station comprises an operating system and the at least one data requesting station comprises at least one application.

11. A computer program product comprising:
    a non-transitory computer readable storage medium having computer readable program code embodied therewith, the computer readable program code comprising:
    computer readable program code configured to generate output data utilizing at least one data generation station; and
    computer readable program code configured to communicate via the at least one data generation station output data related to at least one data request received from at least one data requesting station responsive to user-defined criteria comprising expiration of a time period and generation of a threshold amount of output data, and responsive to a user-configurable scheme function;

wherein the criterion of expiration of a time period defines a minimum time delay and a maximum time delay;

wherein the criterion of generation of a threshold amount of data defines a minimum batch size and a maximum batch size; and wherein the at least one data generation station communicates output data responsive to:

a data size reaching the maximum batch size;

a data size reaching the minimum batch size; and a delay time reaching the minimum delay time.

12. The method according to claim 7, wherein the at least one data generation station communicates output data responsive to a delay time reaching the maximum time delay.

* * * * *